June 12, 1934.   LE ROY A. PRESCOTT   1,962,934
LIQUID MEASURING PUMP
Filed May 23, 1932   2 Sheets-Sheet 2
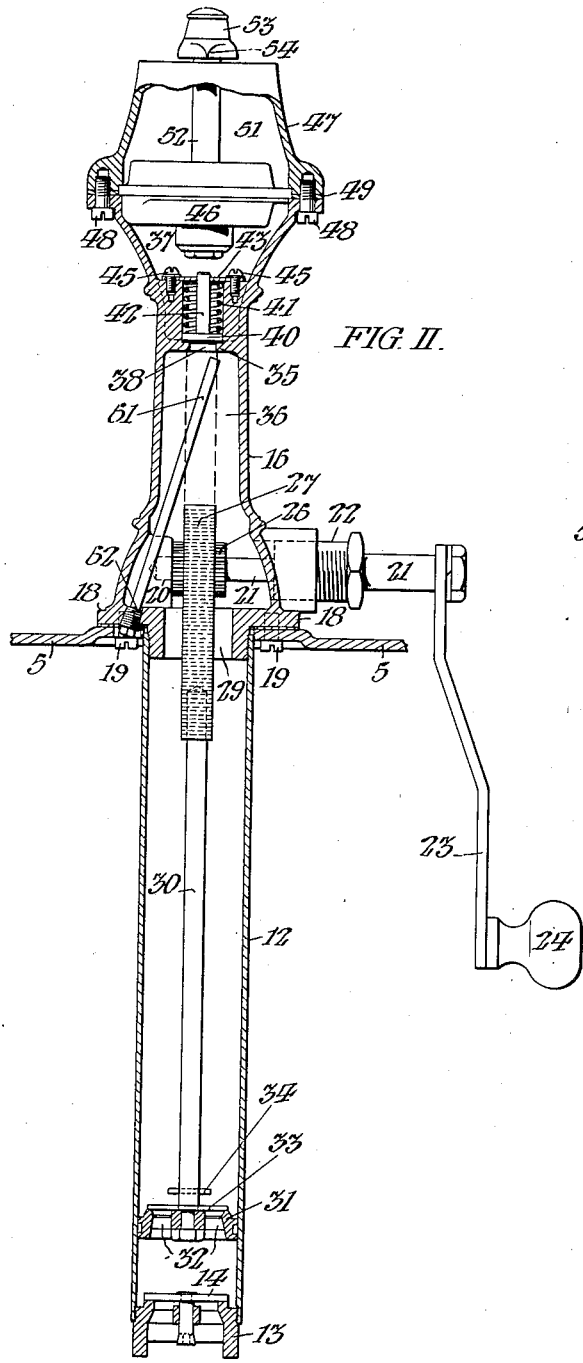
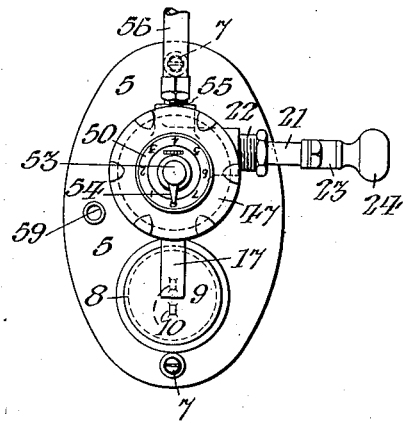
INVENTOR:
LeRoy A. Prescott,
BY Arthur E. Paige
Attorney.

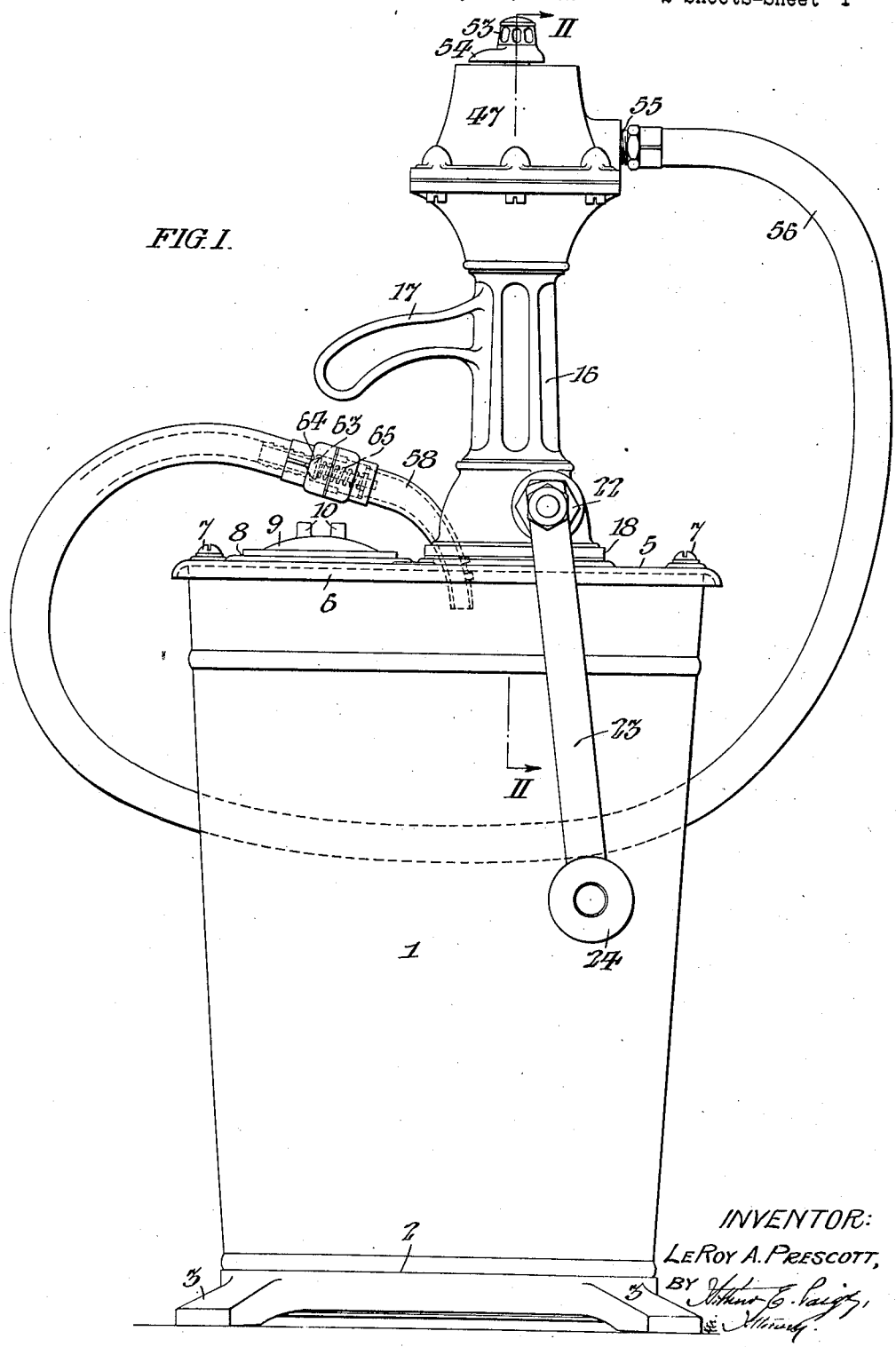

Patented June 12, 1934

1,962,934

UNITED STATES PATENT OFFICE 1,962,934

LIQUID MEASURING PUMP

Le Roy A. Prescott, Lyncott, Mich., assignor to Service Station Equipment Company, Conshohocken, Pa., a corporation of Delaware Application May 23, 1932, Serial No. 613,043

10 Claims. (Cl. 221—102)

My invention is particularly applicable to pumps for dispensation of viscous liquids such as lubricating greases and including a portable container from which the liquid is elevated by a pump comprising a reciprocatory piston operatively connected with a rotary crank. The grease is thus progressed step by step through a flow meter including a rotary index pointer which traverses a circular graduated scale. Ordinarily, the intermittent reciprocation of the pump piston permits the formation of bubbles and pockets of air in the grease elevated from the container which cause a false manifestation of the amount of grease dispensed through the meter if the air is allowed to remain thus occluded in the stream of grease forced through the meter.

Therefore, the principal object and effect of my invention is to provide simple and efficient means for eliminating the air from the grease during its passage from the pump to the meter so that the meter shall accurately manifest only the actual volume of grease dispensed. As hereinafter described, my improved air releasing means includes a by-pass conduit extending from the upper portion of the passageway between the pump and the meter back into the container aside from the pump. The construction and arrangement are such that the air is squeezed from the stream of grease in said passageway, at the region of said by-pass conduit and escapes from said passageway back into the container, accompanied by a comparatively small amount of grease, leaving the passageway fully charged with a solid stream of grease from the region of said by-pass to the meter.

It is characteristic of the form of my invention chosen for illustration that the air release by-pass is embodied in a single casting which forms the head of the pump structure projecting from the grease container and carried by a cover for the latter; said casting being provided with a handle by which the whole apparatus is readily portable. Moreover, said head includes a vertical tubular column containing two chambers, one above the other, with a grease port between them controlled by a check valve which opens under pressure of the grease from the lower chamber to permit the discharge of the grease into the upper chamber; and the upper chamber incloses the flow meter which forms a closure for the upper end of that chamber which is the grease inlet chamber for said meter. Said meter is rigidly but detachably connected with the top of said column by an inverted cup-shaped cap carrying at its upper end the circular graduated scale aforesaid. A shaft extends from said meter in coaxial relation with said column and through said scale and carries above the latter said rotary index pointer. Said cap forms a grease discharge chamber in communication with said meter and has a side outlet port leading to a flexible hose through which the grease is dispensed.

My copending application Serial No. 588,042 filed January 22, 1932, for Letters Patent of the United States for Improvement in liquid metering pumps, shows a grease pump having air eliminating means of the general character above contemplated, but in that case the flow meter is a separate structure connected with the grease pump like a pipe fitting, and my present invention is advantageous with respect thereto, first, in providing, in connection with the pump head, an inclosure for a simpler and less costly type of meter; second, in providing a pump head which is detachably connected with the grease container, so that the latter may be entirely opened at its upper end for inspection or repairs; and, third, in providing a simpler and less costly construction and arrangement of the air eliminating means.

My invention includes the various novel features of construction and arrangement hereinafter more definitely specified.

In said drawings, Fig. I is a side elevation of a liquid metering pump conveniently embodying my invention.

Fig. II is a fragmentary vertical sectional view of said pump taken on the line II, II, in Fig. I.

Fig. III is a plan view of said pump but on a smaller scale than Figs. I and II.

In said figures; the liquid container 1 is conveniently formed as a cone of sheet metal, of elliptical cross section, having its truncated apex tightly fitted in the annular base 2 having four feet 3. Said container has the cover 5 conveniently formed of wrought metal having a downwardly turned flange 6 detachably engaging the upper end of said container 1 and rigidly but detachably secured in connection therewith by the two screws 7 shown in Figs. I and III. Said cover 5 has the liquid inlet opening 8 normally closed by the screw plug 9 having the wrench hold 10 comprising two lugs projecting upwardly from the top thereof, whereby said plug may be engaged and turned to and from its closed position indicated in Fig. III.

Said cover 5 carries, suspended in said container 1, the pump cylinder 12. Said cylinder has, at the lower end thereof, the intake foot 13 provided with the foot valve 14 which is, in fact, a check valve which opens inwardly to permit ingress of grease but closes to prevent egress of grease from said pump cylinder 12. Said pump cylinder 12 is carried by the single casting 16 which forms a casing head for the pump, projecting exterior to said container and having the handle 17 by which the whole structure is readily portable. Said head casing 16 is a hollow column having the annular flange 18 which is detachably rigidly connected with said container cover 5, conveniently by the screws 19 indicated in Fig. II, extending through said cover and in threaded engagement with said flange.

Said pump head casing 16 has the journal bearing 20 for the inner end of the crank shaft 21 which is also journaled in the stuffing box 22 and is provided with the crank lever 23 at its outer end, having the handle 24 by which it may be conveniently rotated. Said shaft 21 has the gear 26 between its bearings, in mesh with the reciprocatory rack bar 27 which is mounted to reciprocate in said casing 16 in engagement with a slide bearing 29 at the lower end of said casing 16. Said rack bar 27 is rigidly connected with the piston rod 30 which carries the piston 31 fitted to reciprocate in said cylinder 12 in grease tight relation therewith. Said piston has grease ports 32 through which grease is forced above the piston as the latter descends and which, when the piston is raised, are closed by the check valve 33 which is a disk loosely fitted on said piston rod 30 and limited in its movement with respect to the piston by the cross pin 34.

The upper movement of said rack 27 is limited by its contact with the diaphragm 35 which separates the lower chamber 36 in said casing 16 from the upper chamber 37 therein, and has the port 38 controlled by the check valve 40 which is normally closed by the spring 41. Said spring 41 encircles the stem 42 of said valve between the upper surface of the valve and the underside of the abutment plate 43 which is detachably secured in said casing 16, conveniently by the two screws 45. Said chamber 37 incloses the flow meter 46 which forms a closure for the upper end of that chamber which is a grease inlet chamber for said meter. Said meter is rigidly but detachably connected with the top of said column by the inverted cup-shaped cap 47 which is clamped thereon by the screws 48, indicated in Fig. II; the gasket 49 being interposed between the top of the casing 16 and said cap 47 to render the joint between them grease tight. Said cap 47 carries at its upper end the circular graduated scale 50. Said flow meter casing 46 contains a rotary member which is displaced by the flow of liquid therethrough from the chamber 36 to the grease discharge chamber 51 in said cap 47, and is operatively connected with the shaft 52 which extends from said meter 46 in coaxial relation with said column 16 and through said scale, and carries above the latter the knob 53 having the rotary index pointer 54.

Said cap 47 has the side outlet port 55 leading to the flexible hose 56 through which the grease is dispensed. Said hose has at its discharge end the metal nozzle 58 which is adapted to be fitted through the opening 59 in the cover 5, shown in Fig. III, to the position shown in Fig. I, so that any grease accidentally discharged therefrom falls within said container 1.

As shown in Fig. II; the lower chamber 36 in said casing 16, which receives the grease directly from the pump cylinder 12 and, with it, any air bubbles occluded therein, has extending downwardly from the top thereof the air vent conduit 61 which is rigidly connected with said casing 16 by the screw 62 at the lower end of said conduit which opens into the container 1 outside of said pump cylinder 12. As indicated in dotted lines in Fig. II, the rack 27 is thrust into said chamber 36 to the top thereof, against said partition 35, at each upward stroke of the piston 31, with the effect of breaking up and further compressing the body of grease lifted into said chamber 36 by the upward movement of said piston. Therefore, the operation of said pump so compresses the grease in the chamber 36 as to squeeze the air out of it and discharge the air back into the container 1 through said by-pass conduit 61 with a small amount of grease, and leave only a solid stream of liquid to pass through the port 38 to the meter 46; so that the meter manifests only the actual amount of liquid dispensed therethrough.

It may be observed that the elimination of air, or other gas, from the stream of liquid propelled by the pump is thus effected after the liquid has been discharged from the pump cylinder 12, but before said stream enters the flow meter 46, and that such elimination is effected without the interposition of any flow retarding valve between the pump piston and the discharge opening from the pump cylinder. Moreover, such elimination is automatically effected by the pressure of the liquid necessary to dispense it through the port 38, and around the valve 40, against the pressure of the spring 41; the release of the gas from the voids in the stream of liquid being effected by breaking the stream of liquid with the pump piston rack 27 against the partition 35 in the confined chamber 36.

Although gas may be automatically eliminated from the voids in the liquid by the pressure of the latter against the check valve 40; I find it convenient to also provide a check valve 63 in the nozzle 58 which is normally pressed against the seat 64 by the spring 65 to obstruct the passage of liquid through the dispensing conduit but is opened when the pressure of the liquid exceeds that sufficient to effect elimination of gas through said gas escape conduit 61. That check valve 63 has the effect of preventing draining liquid from the hose when the liquid forcing means is inactive; so that the liquid discharge conduit is continually charged with liquid from the meter 46 to the nozzle valve 63. In fact, gas may be eliminated from the voids in the liquid without the employment of the check valve 40 and its spring 41, if the spring 65 is so proportioned that the valve 63 is only opened by a pressure upon the liquid in excess of that required to effect such elimination.

Therefore, I do not desire to limit myself to the precise details of construction and arrangement herein set forth, as it is obvious that various modifications may be made therein without departing from the essential features of my invention, as defined in the appended claims.

I claim:

1. In liquid dispensing apparatus, the combination with a container for the liquid to be dispensed; of a cover for said container; a pump carried by said cover and having a liquid inlet port in said container; a pump head casing carried by said cover in registry with said pump cylinder and including a confined chamber having a liquid discharge port in the top thereof; a spring pressed check valve normally closing said port but adapted to open upwardly; a meter chamber in said pump head above said check valve; and a flow meter inclosed in said meter chamber.

2. In liquid dispensing apparatus, the combination with a container for the liquid to be dispensed; of a cover for said container; means detachably securing said cover in connection with said container; a pump carried by said cover and having a liquid inlet port in said container; a pump head casing carried by said cover in registry with said pump cylinder and including a confined chamber having a liquid discharge port in the top thereof; a spring pressed check valve normally closing said port but adapted to open upwardly; a meter chamber in said pump head above said check valve; and a flow meter inclosed in said meter chamber; whereby, said pump may be removed from said container, by and with said cover.

3. In liquid dispensing apparatus, the combination with a container for the liquid to be dispensed; of a cover for said container; a pump cylinder carried by said cover and having a liquid inlet port in said container; a pump head casing carried by said cover in registry with said pump cylinder and including a confined chamber having a liquid discharge port in the top thereof; a spring pressed check valve normally closing said port but adapted to open upwardly; a chamber in said pump head above said check valve; a flow meter inclosed in the last named chamber; a cap fitted over said flow meter and having a liquid discharge outlet; and means detachably securing said cap in normally rigid relation with said pump head casing.

4. In liquid dispensing apparatus, the combination with a container for the liquid to be dispensed; of a cover for said container; a pump cylinder carried by said cover and having a liquid inlet port in said container; a pump head casing carried by said cover in registry with said pump cylinder and including a confined chamber having a liquid discharge port in the top thereof; a spring pressed check valve normally closing said port but adapted to open upwardly; a chamber in said pump head above said check valve; a flow meter inclosed in the last named chamber; a cap fitted over said flow meter and having a liquid discharge outlet; means detachably securing said cap in normally rigid relation with said pump head casing; a graduated dial carried by said cap at the top thereof; and a shaft extending from said flow meter and carrying a pointer adapted to cooperate with said dial to indicate the volume of liquid passed through said meter.

5. In liquid dispensing apparatus, the combination with a container for the liquid to be dispensed; of a cover for said container; a pump carried by said cover and having a liquid inlet port in said container; a pump head casing carried by said cover in registry with said pump cylinder and including a confined chamber having a liquid discharge port in the top thereof; a spring pressed check valve normally closing said port but adapted to open upwardly; a meter chamber in said pump head above said check valve; a flow meter inclosed in said meter chamber; and an air vent conduit extending from said chamber beneath said check valve in communication with said container exterior to said pump cylinder; whereby air and other gases are automatically eliminated from the stream of liquid, between said piston and said check valve, by dispensing operation of said apparatus.

6. In liquid dispensing apparatus, the combination with a container for the liquid to be dispensed; of a cover for said container; a pump carried by said cover and having a liquid inlet port in said container; a pump head casing carried by said cover in registry with said pump cylinder and including a confined chamber having a liquid discharge port in the top thereof; a spring pressed check valve normally closing said port but adapted to open upwardly; a meter chamber in said pump head above said check valve; a flow meter inclosed in said meter chamber; a cap fitted over said flow meter and having a liquid discharge port; means detachably securing said cap in normally rigid relation with said pump head casing; a graduated dial carried by said cap at the top thereof; a shaft extending from said flow meter through said dial and carrying a pointer exterior thereto, adapted to cooperate with said dial to indicate the volume of liquid passed through said meter; and an air vent conduit extending from the top of said chamber beneath said check valve and detachably rigidly connected at its lower end in said pump head casing exterior to said pump cylinder; whereby air and other gases are automatically eliminated from the stream of liquid, between said piston and said check valve, by dispensing operation of said apparatus.

7. In liquid dispensing apparatus, the combination with a container for the liquid to be dispensed; of a cover for said container; a pump cylinder carried by said cover and having a liquid inlet port in said container; a pump head casing carried by said cover in registry with said pump cylinder and including a confined chamber having a liquid discharge port in the top thereof; a spring pressed check valve normally closing said port but adapted to open upwardly; a meter chamber in said pump head above said check valve; a flow meter inclosed in said meter chamber; an air vent conduit extending from the top of said chamber beneath said check valve and in communication with said container exterior to said pump cylinder; a piston mounted to reciprocate in said pump cylinder and having a piston rod mounted to reciprocate in said chamber beneath said check valve; and means for reciprocating said piston rod and piston; whereby air and other gases are automatically eliminated from the stream of liquid, which is broken between said piston and said check valve, by dispensing operation of said apparatus.

8. In liquid dispensing apparatus, the combination with a container for the liquid to be dispensed; of a cover for said container; a pump cylinder carried by said cover and having a liquid inlet port in said container; a pump head casing carried by said cover in registry with said pump cylinder and including a confined chamber having a liquid discharge port in the top thereof; a spring pressed check valve normally closing said port but adapted to open upwardly; a meter chamber in said pump head above said check valve; a flow meter inclosed in said meter chamber; a graduated dial carried by said cap at the top thereof; a shaft extending from said flow meter through said dial and carrying a pointer exterior thereto, adapted to cooperate with said dial to indicate the volume of liquid passed through said meter; an air vent conduit extending from the top of said chamber beneath said check valve and detachably rigidly connected at its lower end in said pump head casing exterior to said pump cylinder; a piston mounted to reciprocate in said pump cylinder and having a gear rack mounted to reciprocate in said chamber beneath said check valve; and means for reciprocating said piston rod and piston including a gear engaging said rack; whereby air and other gases are automatically eliminated from the stream of liquid, which is broken, by said rack, between said piston and said check valve, by dispensing operation of said apparatus.

9. A dispensing and measuring apparatus for viscous substances, such as grease, comprising a container for the grease, a pump, a meter, a discharge line, and a discharge nozzle mounted upon said container and connected together so that upon actuation of said pump grease will flow from said container through said meter discharge line and nozzle in succession, a valve adjacent said nozzle mounted to move in a direction opposite to the direction of flow of grease therethrough, spring means to automatically seat said valve and prevent flow of grease from said nozzle when said pump is not in operation and to impose a resistance to the free flow grease through the meter and nozzle upon actuation of said pump, and a bypass having its outlet opening into said container above the level of grease therein and its inlet between said pump and meter, the resistance of said spring means causing air entrained in the stream of grease to be returned to said container above the level of grease therein without entering said meter.

10. A dispensing and measuring apparatus for viscous substances, such as grease, comprising a container for the grease, a pump having its inlet below the level of grease in said container and its outlet connected to a meter, a discharge line, and a discharge nozzle, said pump, meter, discharge line and nozzle being mounted upon said container and connected together so that upon actuation of said pump grease will flow from said container through said meter, discharge line and nozzle in succession, and a bypass having its outlet in said container above the level of grease therein so as to be remote from the inlet to said pump and so that the grease within the container does not obstruct said outlet and having its inlet in the path of the grease between said pump and meter so that air entrained in the stream of grease will be returned to said container above the grease therein.

LE ROY A. PRESCOTT.